US006633566B1

United States Patent
Pierson, Jr.

(10) Patent No.: US 6,633,566 B1
(45) Date of Patent: Oct. 14, 2003

(54) METHOD, APPARATUS AND COMPUTER PROGRAM PRODUCT FOR INTERFACING A TDM LINK WITH A CELL-SWITCHED NETWORK

(75) Inventor: Forrest L. Pierson, Jr., Dallas, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/097,754

(22) Filed: Jun. 16, 1998

(51) Int. Cl.[7] ............................................. H04L 12/56
(52) U.S. Cl. ................... 370/395.1; 370/466; 370/473; 370/474
(58) Field of Search ............................... 370/352, 356, 370/376, 389, 392, 395.1, 396, 397, 442, 458, 459, 465, 466, 470, 471, 472, 473, 474, 476, 477, 498, 503, 505, 521, 522, 528, 535, 541, 542, 468, 395.61

(56) References Cited

U.S. PATENT DOCUMENTS

| | | | | |
|---|---|---|---|---|
| 5,337,306 A | * | 8/1994 | Hall | 370/249 |
| 5,878,045 A | * | 3/1999 | Timbs | 370/466 |
| 5,889,773 A | * | 3/1999 | Stevenson, III | 370/352 |
| 5,930,253 A | * | 7/1999 | Brueckheimer et al. | 370/395 |
| 6,038,237 A | * | 3/2000 | Tsuruta et al. | 370/395.61 |
| 6,263,016 B1 | * | 7/2001 | Bellenger et al. | 375/222 |

* cited by examiner

Primary Examiner—Dang Ton
Assistant Examiner—Inder Pal Mehra (57) ABSTRACT

A method, apparatus, and computer program product of interfacing a time-domain multiplexed (TDM) link with a cell-switched network. The TDM link supports one or more active channels and one or more idle channels and supplies TDM frames with a sample of each channel in a dedicated timeslot. The TDM link is terminated at a first network node. One or more idle timeslots are removed from each TDM frame to create a compressed TDM frame, where each idle timeslot carries a sample of an idle channel. One or more compressed TDM frames are loaded in a cell that is sent over the cell-switched network to a second network node. The compressed TDM frames are unloaded from the cell. Idle timeslots are inserted in the compressed TDM frames to restore the compressed TDM frames to complete TDM frames. The bandwidth of the cell switched network is efficiently utilized because idle channel samples are not carried over the cell-switched network. In one embodiment, the TDM link is a T1 link that carries T1 frames, and the cell switched network is an Asynchronous Transfer Mode (ATM) network that carries ATM cells.

23 Claims, 8 Drawing Sheets

T1 Emulation Over An ATM Network

FIG. 1

T1 Emulation Over An ATM Network

T1 Frame

FIG. 2

Extended Superframe

FIG. 3

ATM Cell Structure

Configuration Step 505

FIG. 8
ATM Transmitter

FIG. 9
ATM Receiver

FIG. 10

METHOD, APPARATUS AND COMPUTER PROGRAM PRODUCT FOR INTERFACING A TDM LINK WITH A CELL-SWITCHED NETWORK

CROSS REFERENCE TO RELATED APPLICATIONS:

This patent application is related to the following commonly owned, U.S. patent applications:

1. "Method and System for Processing an HDLC Message", Ser. No. 09/097,996, now U.S. Pat. No. 6,195,346, by Forrest Pierson, filed concurrently herewith and incorporated herein by reference;
2. "Method and System for Unloading T1 Payloads from ATM cells +", Ser. No. 09/097,755, now U.S. Pat. No. 6,487,198, by Forrest Pierson, filed concurrently herewith and incorporated herein by reference; and
3. "Method and System for Emulating a TDM Link Over Cell-Switched Network", Ser. No. 09/099,671, now U.S. Pat. No. 6,272,128, by Forrest Pierson, filed concurrently herewith and incorporated herein by reference.

BACKGROUND OF THE INVENTION

1. Field of the Invention

The present invention relates generally to digital communications over a communications network. In particular, the present invention is directed toward interfacing a time domain multiplexed (TDM) link with a cell-switched network.

2. Related Art

A communications network serves to transport information among a number of locations. The information is usually presented to the network in the form of time domain electrical signals and can represent any combination of voice, video, or computer data. A typical communications network consists of various physical sites called "nodes", interconnected by conduits called "links". Each link carries information from one node to another node. End user nodes contain data terminating equipment (DTE) for combining, separating, and transforming data and voice. As such, a DTE can be a voice switch, data switch, or a combination of the two. A series of non-DTE nodes interconnected to each other with ATM links is often referred to as an ATM cloud. A DTE is typically connected to the ATM cloud at one point, and may be connected with an ATM link, other types of data links including frame relay, or digital time domain multiplexed (TDM) communications links such as T1. When an ATM cloud node is connected to a DTE over a non-ATM link, it is typically called circuit emulation.

T1 (also known as DS1) is one type of a TDM communications link. T1 is a synchronous link capable of carrying 24 DS0 channels which are TDM and transmitted over a single physical line. A DS0 channel is a 64 kilobits per second (64 Kbps) channel, which is the world wide standard for digitizing voice conversation. The 64 Kbps bit rate is chosen because an analog voice signal can be adequately represented by a digital data stream if sampled at a rate of 8000 samples per second. If each voice sample is digitized using 8 bits, this results in a digital data stream of 64 Kbps.

A T1 link transmits one T1 frame 8000 times per second (or one frame every 125 $\mu$s). Each T1 frame carries a T1 payload with, 24 DS0 timeslots, one for each DS0 channel. Each timeslot contains an 8 bit sample of the corresponding DS0 channel. Each T1 frame also has T1 frame bit that identifies the start of the T1 frame, so that a T1 frame has a total size of 193 bits. This results in a data stream of 1.544 Mbps (8000 frames/sec·193 bits/frame).

A T1 superframe is a group of 12 T1 frames. Each superframe contains a frame bit section composed of 12 frame bits, and a payload section composed of 12 samples for each of the 24 DS0 channels. A T1 extended superframe (ESF) is a group of 24 T1 frames. Each ESF frame is composed of an ESF frame bit section that contains 24 frame bits, and an ESF payload section that contains 24 samples of each of the 24 DS0 channels.

Although T1 was developed for voice communications, it is not limited to voice communications. The physical line can carry digitized voice samples, digital computer data, or any other type of data in any combination in the 24 channels. Thus, a broader definition of a T1 link is a digital transmission link with a capacity of 1.544 Mbps.

Since T1 is a synchronous TDM link, once a channel connection has been setup between two users, that channel is dedicated until the connection is torn down. This channel dedication is an inefficient use of the 1.544 Mbps capacity of a T1 link. For example, assume channel #5 of the 24 T1 channels is set up between user A and user B. Channel #5 will carry all communication between user A and user B. If there is a pause in the communication, (such as user A putting user B on hold) during the transmission of a particular T1 frame, then that particular T1 frame will carry an empty channel #5 timeslot. Even a short pause of one minute can lead to 480,000 T1 frames being transmitted with an empty channel #5 timeslot.

Asynchronous Transfer Mode (ATM) is an asynchronous type of communications protocol based on a cell-switched network. It is designed to be carried over the emerging fiber optical network, called the Synchronous Optical NETwork (SONET), although it can be carried over almost any communications link. The basic unit of ATM is the ATM cell. Each cell contains two parts; a header, which contains routing information, and a payload, which contains the data to be transported from one end node to another.

ATM is considered "asynchronous" because each node in the network does not know until after a cell arrives where the cell is intended to go. In a synchronous TDM network, each timeslot is assigned a certain time when it is to arrive at each node. The arrival time of a timeslot determines where the timeslot is routed. Thus, the individual frames and timeslots do not need to have routing information within them. The arrival of a particular ATM cell at a node, on the other hand, is not guaranteed to occur at a particular point in time.

ATM is considered a cell-switched network because the node bases its cell routing decision on the information carried in the ATM cell. After a cell arrives, the node reads the destination address in the cell header to determine the destination node. If the current node is not the destination node, the node determines the best route based on network status and the destination address.

There are a number of factors which makes ATM attractive to the telecommunications industry. One is the lower cost of the optical fiber transport mechanism supporting ATM. On a bit per bit basis, a SONET transport mechanism is significantly less expensive than using metallic links by several factors of ten. The theoretical capacity of fiber is in excess of 20 tera bits per second (20 million million bits per second). Current technology is at 40 thousand million bits per second, and will soon increase to 160 thousand million bits per second. As technology improves, more information can be sent over each fiber optic buried in the ground or underwater.

On the other hand, metallic links that can span long distances and are reasonable to manufacture, have long ago reached their theoretical limits of roughly under 500 million bits per second, and are much bulkier than fiber optic links. The metallic link is also susceptible to rust and corrosion, whereas the fiber is relatively chemically inert. Because of signal attenuation (loss of signal strength as a signal travels down a link) on either type of link, repeaters which reamplify the signal are needed. Metallic links attenuate the signals more than do fiber links, so more repeaters for metallic links are needed than for fiber links for a given distance. For instance, a T1 link can span a maximum of just over one mile (6000 feet) before a repeater is needed. It is not unusual for fiber optic links to span 50 to 100 miles between repeaters.

For this reason, it is now cost effective for two end nodes of a T1 link to convert their T1 signals into ATM cells, and send the ATM cells across a SONET network to the destination node. The ATM cells are reconverted to T1 at the destination node. The T1 signals are then sent to a DTE where the DS0 channels are de-multiplexed and sent to their particular user destinations. This approach is referred to as T1 emulation over an ATM network (or T1 over ATM, for short).

T1 emulation requires an interface between the synchronous TDM T1 link and the cell-switched ATM network. Conventional interfaces package at least one complete T1 frame in each ATM cell regardless of the number channels that are currently active on the T1 link. For example, assume that channels #3, #12, and #23 are the only active channels on a T1 link, and the remaining 21 channels are waiting for users to initiate communications. In this case, each T1 frame will have 3 timeslots that carry meaningful digitized samples of channel communications. The remaining 21 timeslots will carry digitized samples of thermal noise. Conventional T1/ATM interface methods load all 24 timeslots from each T1 frame in an ATM cell, which is an inefficient use of the available bandwidth of the ATM network.

A TDM link needs to be interfaced with a cell-switched network so that the available bandwidth of the network is efficiently utilized.

SUMMARY OF THE INVENTION

The present invention relates generally to digital communications over a communications network. In particular, the present invention provides a method, apparatus, and computer program product for interfacing a time domain multiplexed (TDM) link to a cell switched network.

In one embodiment of the invention, the TDM link is a T1 link and the cell-switched network is an Asynchronous Transfer Mode (ATM) network. The T1 link supports different combinations of active channel(s) and idle channel(s).

The T1 link is terminated at a first node of the ATM network. The T1 link carries T1 frames that contain a sample of each channel supported by the T1 link in a dedicated timeslot. The idle timeslots are removed from each T1 frame to create a compressed T1 frame, where each idle timeslot carries a sample of an idle channel. One or more compressed T1 frames are inserted in a data cell that travels over the ATM network to a second node, where each compressed T1 frame comprises active timeslots which carry a sample of an active channel.

Data cells are ATM cells that carry compressed T1 frames and are assigned a unique address in their cell header. The address identifies the cell as a data cell and identifies the destination address of the cell. Data cells are distinguished from overhead cells, which carry overhead messages used during interface configuration, by their addresses.

The compressed T1 frames are unloaded from each data cell at the second node. Idle timeslots are inserted in each compressed T1 frame to restore the compressed T1 frames to complete T1 frames. The restored T1 frames are then sent to a DTE. The DTE de-multiplexes the restored T1 frames and sends the channel samples to their respective channel users.

An advantage of the present invention is that samples of idle channels are not carried over the cell-switched network. This results in more efficient utilization of cell-switched network bandwidth than produced by conventional interface methods.

In one embodiment, the first node is a Master node, and the second node is a Slave node. The T1/ATM interface is configured based on a channel status message that is received at the Master node. The channel status message identifies which T1 channels are active channels and which channels are idle channels. A cell structure is determined at the Master node that maximizes the number of compressed T1 frames that can be carried in a data cell. A data address is then assigned to the cell structure.

The cell structure and corresponding data address are communicated to the Slave node in an overhead message carried by one or more overhead cells. The overhead cells are identified by an overhead address in the cell header.

One advantage of the present invention is the ability to adapt to changing channel status. Changing channel status can result in multiple channel status messages, which leads to multiple cell structures. When multiple cell structures are active and a data cell is received, the cell structure of the data cell is identified by the data address in the data cell header.

If a channel status message is received at the Slave node, then the Slave node communicates the channel status message to the Master node in one or more overhead cells. Another advantage of the present invention is that simultaneous changes in cell structure are avoided by requiring all cell structure decisions to be made at the Master node.

BRIEF DESCRIPTION OF THE FIGURES

The accompanying figures, which are incorporated herein and form part of the specification, illustrate the present invention and, together with the description, further serve to explain the principles of the invention and to enable a person skilled in the pertinent art to make and use the invention. In the figures.

The present invention is described with reference to the accompanying figures. The following convention is generally adhered to in assigning reference numbers. In the figures, like reference numbers often indicate identical or functionally similar elements. Additionally, the left-most digit(s) of a reference number identifies the figure in which the reference number first appears.

DETAILED DESCRIPTION OF THE PREFERRED EMBODIMENTS

Table of Contents

I. Overview
II. Terminology
III. Example Environment
IV. T1 Frame and T1 Extended Superframe
V. ATM Cell Structure
VI. Interfacing a TDM T1 Link with an Cell-Switched ATM Network
VII. ATM Port Card Block Diagram
   A. Transmitting and Receiving Compressed T1 Frames
   B. Configuring the T1/ATM Interface
   C. Compressing and Expanding T1 Frames
VIII. Cell Structure
IX. E1 Emulation
X. Computer Implementation of the Invention
XI. Conclusion

I. Overview

The present invention is directed toward interfacing a time domain multiplexed (TDM) link with a cell-switched network. In one embodiment, the TDM link is a standard T1 link and the cell switched network is an Asynchronous Transfer Mode (ATM) network. The T1 link supports one or more active channels and one or more idle channels. The T1 link supplies T1 frames which carry a sample of each channel in a dedicated timeslot. During frame transmission, a port card removes the idle timeslots from each T1 frame to create compressed T1 frames. The compressed T1 frames are then loaded into ATM cells which are sent over the ATM network. During reception, a port card restores the idle timeslots that were removed during transmission.

II. Terminology

To more clearly delineate the present invention, an effort is made throughout the specification to adhere to the following term definitions as consistently as possible. These definitions may be discussed throughout the specification with additional detail.

"Active timeslot" refers to a timeslot in a T1 frame that is assigned to an active channel.

"Asynchronous Transfer Mode (ATM)" refers to a fast cell-switched technology based on a fixed-length 53-byte cell. All broadband transmissions are divided into a series of cells and routed across an ATM network consisting of links connected by ATM nodes and switches. An ATM network carries a constant stream of ATM cells, but has the ability to allocate bandwidth on demand among multiple users.

"ATM cell" refers to the basic unit of ATM. An ATM cell contains a 5-byte header that contains routing information and a 48-byte payload.

"Cell structure" refers to a configuration of a data cell payload.

"Cell switched network" refers to communications network where cell routing decisions are based on a cell address. A cell-switched network can include but is not limited to, current ATM network technology and future extensions thereof.

"Channel status message" refers to a DTE message that identifies which channels supported by a T1 link are active and which channels are idle.

"Compressed T1 frame" refers to a T1 frame having a T1 frame bit, one or more active timeslots, where one or more idle timeslots have been removed.

"Data address" refers to a network address that also identifies a cell structure of a data cell.

"Data cell" refers an ATM cell that carries compressed T1 frames in its payload, and is assigned a data address.

"DTE" refers to Data Terminating Equipment at communications sites or nodes for combining, separating, and transforming data.

"DS0 channel" refers to a standard 64 Kbps channel that carries voice communications, computer data communications, or any other data communications.

"E1" refers to the European version of T1. E1 is capable of carrying 32 distinct 64 Kbps channels, verses 24 for T1.

"Fractional T1" refers to a T1 link that supports.less than 24 distinct DS0 channels. Frames carried on fractional T1 links carry a reduced number of timeslots which corresponds to the reduced number of channels support.

"Idle channel" refers to a DS0 channel that is not currently in use.

"Idle timeslot" refers to a timeslot in a T1 frame that is assigned to an idle channel.

"Network address" refers to an address carried in the Virtual Path Indicator (VPI) and Virtual Channel Indicator (VCI) fields of an ATM cell header that identifies the destination node for an ATM cell.

"Overhead cell" refers to an ATM cell that carries an overhead message in its payload, and is assigned an overhead address.

"TDM link" refers to a time-domain multiplexed communications link. TDM is a synchronous form of communication where routing decisions are based on arrival time. T1 is a form of synchronous TDM communication.

"T1" refers to a time domain multiplexed (TDM) digital transmission link. T1 is capable of carrying 24 distinct 64 Kbps channels. In the United States, Canada, Hong Kong, and Japan, the T1 line bit rate is 1.544 Mbps.

"T1 frame" refers to the basic unit of T1 communications. A T1 frame consists of a T1 frame bit and a T1 payload.

"T1 payload" refers to the portion of a T1 frame that carries the data for the 24 distinct 64 Kbps channels. A T1 payload consists of 24 timeslots, one timeslot for each of the 24 distinct 64 Kbps channels carried by a T1 line. Each timeslot carries a one byte sample of the respective channel message.

"Timeslot" refers to a portion of a T1 payload that carries the one byte sample of the channel message. In this application, the timeslot definition includes the one-byte sample.

III. Example Environment

Before describing the present invention in further detail, it is helpful to describe an example environment in which the invention can be implemented. It is not intended that the invention be limited to the example environment. In fact, after reading the following description, it will become apparent to a person skilled in the relevant art how to implement the invention in alternative environments.

Figure 1:
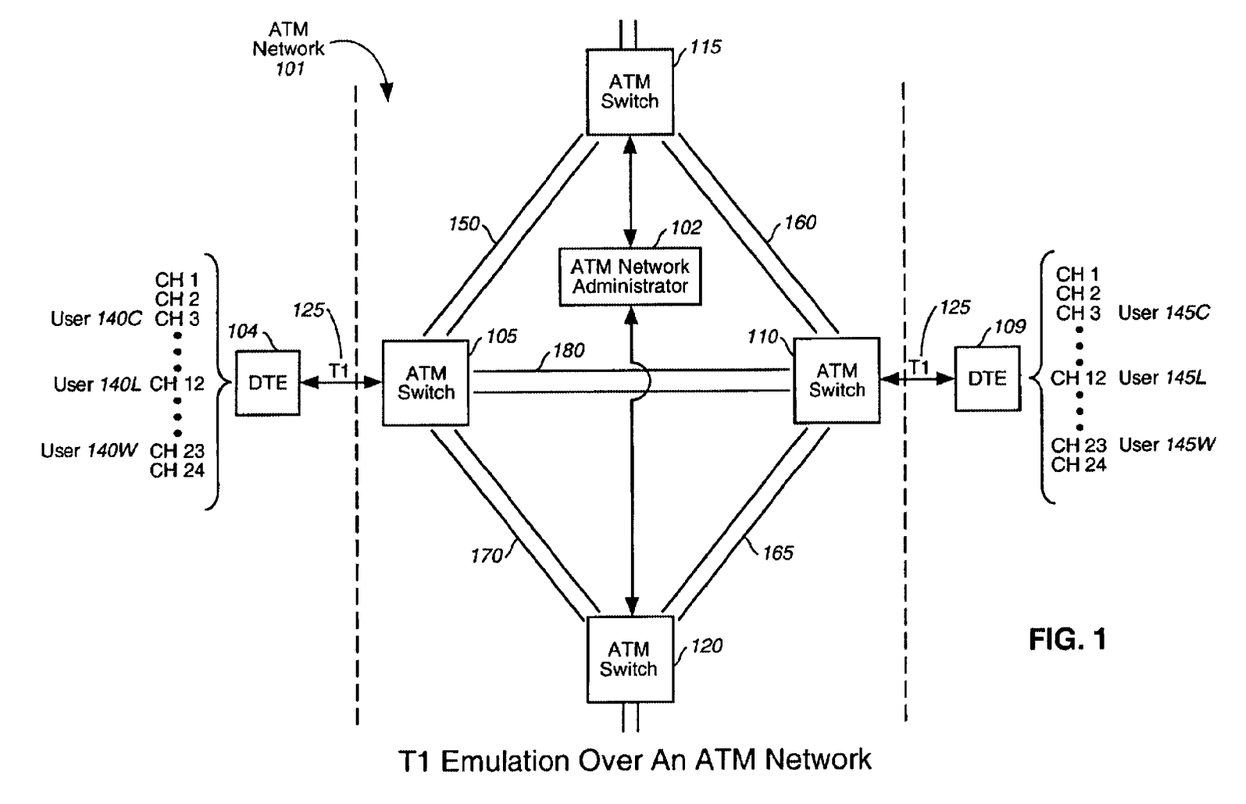
FIG. 1 is a block diagram that illustrates T1 emulation over an ATM network.

One such environment is the use of a cell-switched ATM network to emulate a TDM T1 link. A simple illustration is shown in FIG. 1 where users 140C, L, and W at node 1 are engaged in voice or data communication with users 145C, L, and W at node 2 over channels 3, 12, and 23, respectively. The remaining 21 channels are idle, waiting for users to initiate communications. Channel #24 may not be available for use if it is designated as the high-level data link control channel (HDLC). The HDLC channel is used to carry system level messages between network nodes.

DTEs 104 and 109 multiplex and de-multiplex channel samples as an interface to T1 link 125. For example, during transmission, DTE 104 samples each channel and multiplexes the samples into their respective timeslots of a T1 frame. During reception, DTE 104 de-multiplexes T1 frames and sends the timeslots to their respective channel users. Due to the synchronous nature of TDM links, the T1 frames on T1 link 125 include samples from the 3 active channels, as well as the 21 idle channels. This is necessary because a standard DTE distributes a particular timeslot to particular user based on the timeslot position in the T1 frame. Often, a DTE will use switch matrix to do the actual multiplexing and de-multiplexing. The switch matrix may be on-site or off.

T1 emulation occurs by terminating T1 link 125 at ATM switches 105 and 110, where ATM switches 105 and 110 are an interface between T1 link 125 and ATM network 101. For example, to carry transmissions from DTE 104, ATM switch 105 packages the T1 frames in ATM cells and determines the route to ATM switch 110 that is the most appropriate. Link 180 is clearly the most direct. But it may be that the level of existing data traffic on link 180 would require storage of the ATM cells before they can be sent on link 180. This may occur if network administrator 102 has directed ATM switch 105 or 110 to send additional cells on link 180.

Thus, ATM switch 105 may choose to send the ATM cells over link 150 to ATM switch 115 to avoid excessive traffic. If so, ATM switch 115 reads the address in an ATM cell header and sends the ATM cells to ATM switch 110 via link 160. Alternatively, ATM switch 105 may choose to send ATM cells to ATM switch 120 via link 170. If so, ATM switch 120 reads the address in an ATM cell header and sends the ATM cells to ATM switch 110 via link 165.

IV. T1 Frame and T1 Extended Superframe

Figure 2:
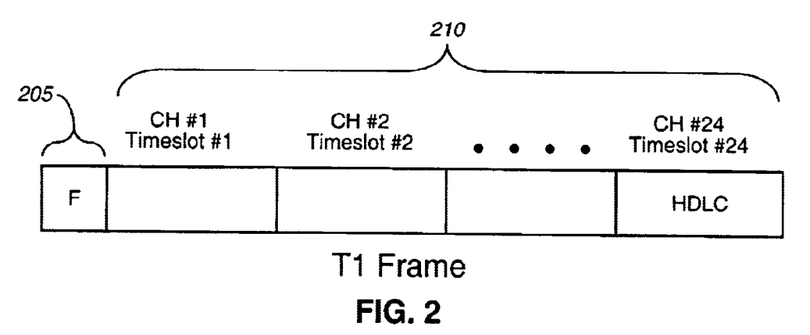
FIG. 2 is a diagram that illustrates the structure of a T1 frame.

FIG. 2 illustrates an example T1 frame carried by T1 line 125 in FIG. 1. The T1 frame consists of a T1 frame bit 205 and a T1 payload 210. T1 payload 210 consists of 24 multiplexed DS0 timeslots, where each DS0 timeslot carries one byte of a link user message. T1 line 125 transmits 8000 T1 frames per second, which results in each of the 24 DS0 channels having a bit rate of 64 Kbps.

Timeslot #24 in the T1 frame may be used for the high level data link control (HDLC) channel. The HDLC channel carries link management messages back and forth between ATM switch 105 and ATM switch 110. Examples of these link management messages are call setup, and call teardown messages. For example, ATM switch 105 and ATM switch 110 communicate system information to setup a connection over ATM network 101 when user 140A wants to send data to user 145A over T1 line 125. Likewise, ATM switch 105 and ATM switch 110 communicate to tear down the connection when user 140A or user 145A terminates the data transfer.

A fractional T1 link is a T1 link that supports less than 24 distinct DS0 channels. The number of timeslots in a fractional T1 frame is reduced accordingly. For example, if the fractional T1 link supports 11 distinct 64 Kbps channels, each T1 frame will have 11 corresponding timeslots in its fractional payload. Typically, a fractional T1 link still carries 8000 frames per second regardless of the number of channels supported.

Figure 3:
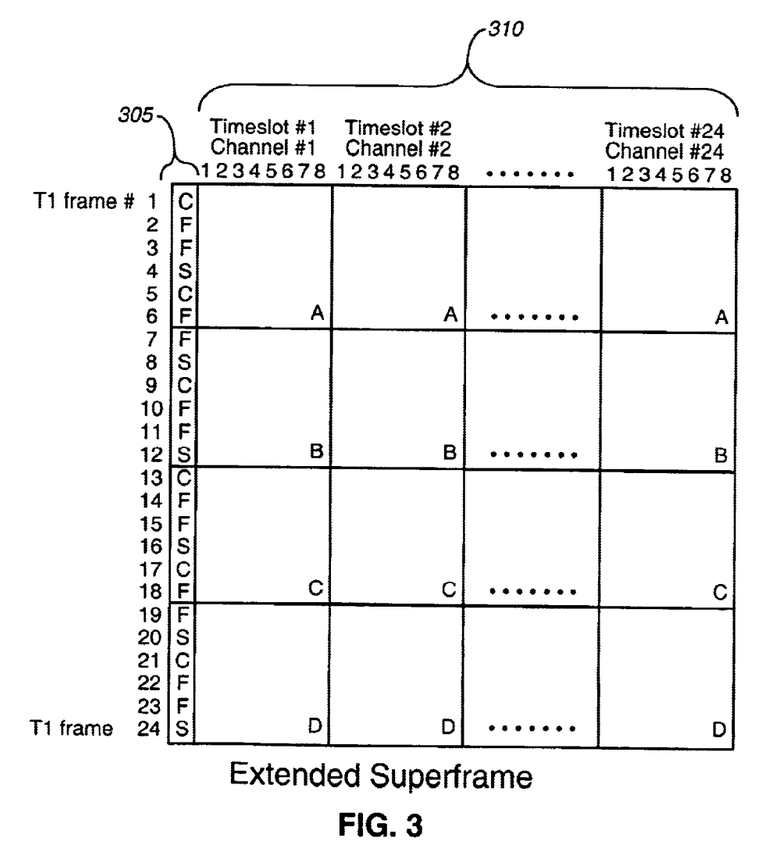
FIG. 3 is a diagram that illustrates the structure of a T1 Extended Superframe.

FIG. 3 represents an Extended Superframe (ESF), which is a group of 24 T1 frames that can be carried by T1 line 125. An ESF consists of frame bit section 305 and a payload section 310.

Frame bit section 305 consists of 24 frame bits that can be one of three different types. Six of the frame bits are synchronization bits ("S" bits). An ESF framer uses the S bits to determine the start of an Extended Superframe. Six of the frame bits are error checking bits ("C" bits) that implement the Cyclic Redundancy Check (CRC-6) method. The CRC-6 test discovers bit errors in the ESF frame caused by the physical line during transmission. Twelve of the frame bits ("F" bits) are used for a Facilities Data Link channel (DL channel). If the CRC-6 test fails for a number of received ESFs, then a status message will be sent to network administrator 102 over the DL channel to give notice of the CRC-6 failures. Network administrator 102 may perform a restoration operation to re-route network traffic and may even dispatch a technician to inspect and repair the physical line based on the status message.

V. ATM Cell Structure

Figure 4:
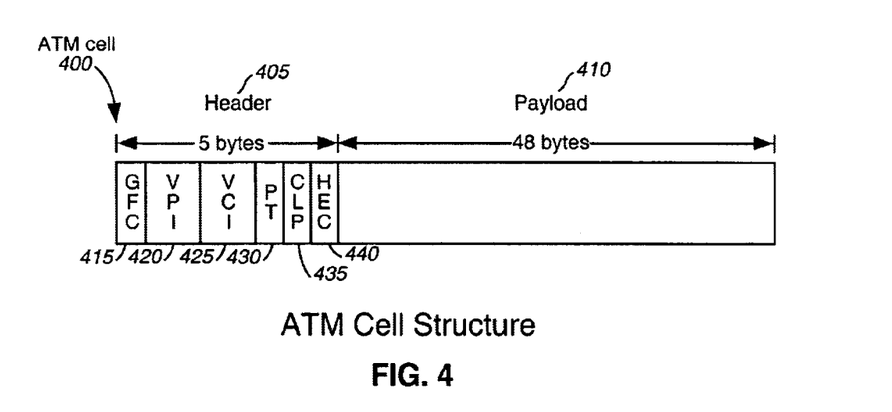
FIG. 4 is a diagram that illustrates the structure of an ATM cell.

FIG. 4 depicts the structure of the typical ATM cell sent over ATM network 101. ATM cell 400 consists of ATM header 405 and ATM payload 410. The ATM header 405 is 5 bytes in length and the ATM payload 410 is 48 bytes (or 384 bits) in length.

ATM header 405 contains 5 distinct fields. In general the ATM header 405 is used to identify the destination, cell type, and priority of the ATM cell. The ATM header fields are as follows: 4 bit generic flow control (GFC) field 415, 12 bit virtual path indicator (VPI) field 420, 16 bit virtual channel indicator (VCI) field 425, 3 bit payload type (PT) field 430, 1 bit cell loss priority (CLP) field 435, and 8 bit header error check (HEC) field 440.

GFC field 415 is reserved to carry the ATM cell flow rate as set by ATM switch 105 in FIG. 1. VPI field 420 and VCI field 425 are used to identify the destination address of a particular ATM cell. This allows ATM switches 115 and 120 to recognize that a particular ATM cell is destined for ATM switch 105 or ATM switch 110. PT field 430 indicates whether a cell contains user data (e.g., voice conversations), signaling data, or something else. CLP bit 435 indicates the relative priority of the cell. Lower priority cells are discarded before higher priority cells during intervals of congestion. HEC field 440 is used to detect errors in the header caused by the physical line during transmission.

As stated above, GFC field 415 is reserved to carry cell flow rate data, but this is not implemented. In one embodiment, GFC field 415 is merged with VPI field 420 to provide a larger 12 bit VPI field. The larger VPI field is used for transmission of cells between components (switches, DTEs) of ATM network 101. This is known as network node interface (NNI).

In an alternative embodiment, GFC field 415 and VPI field 420 are kept separate, and the GFC field 415 is filled with all logic zeros. Any bits set to logic one in the GFC field is ignored. This embodiment is used for transmission of cells between ATM network 101 and end users. This is known as user network interface (UNI).

VI. Interfacing a TDM T1 Link with a Cell-switched ATM Network

Figure 5:
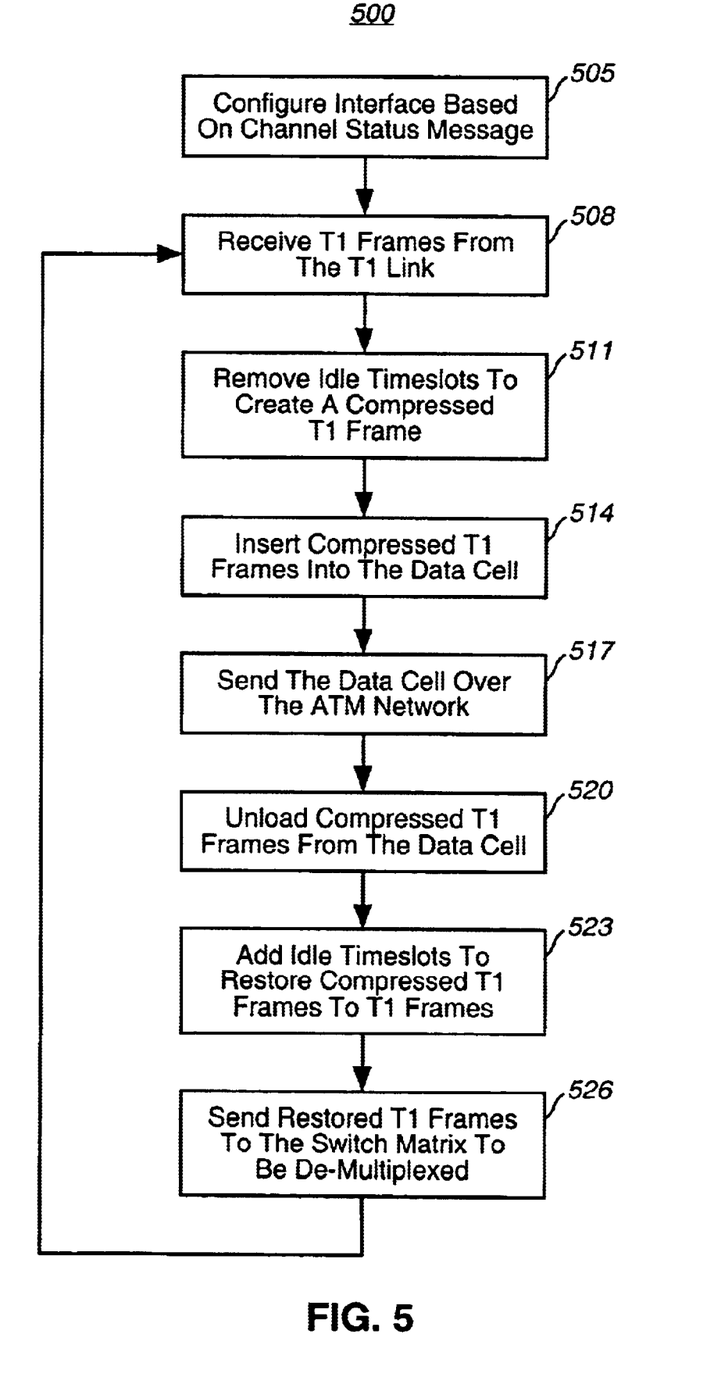
FIG. 5 is a flowchart that illustrates the steps for interfacing a T1 link with an ATM network according to one embodiment of the present invention.
Figure 6:
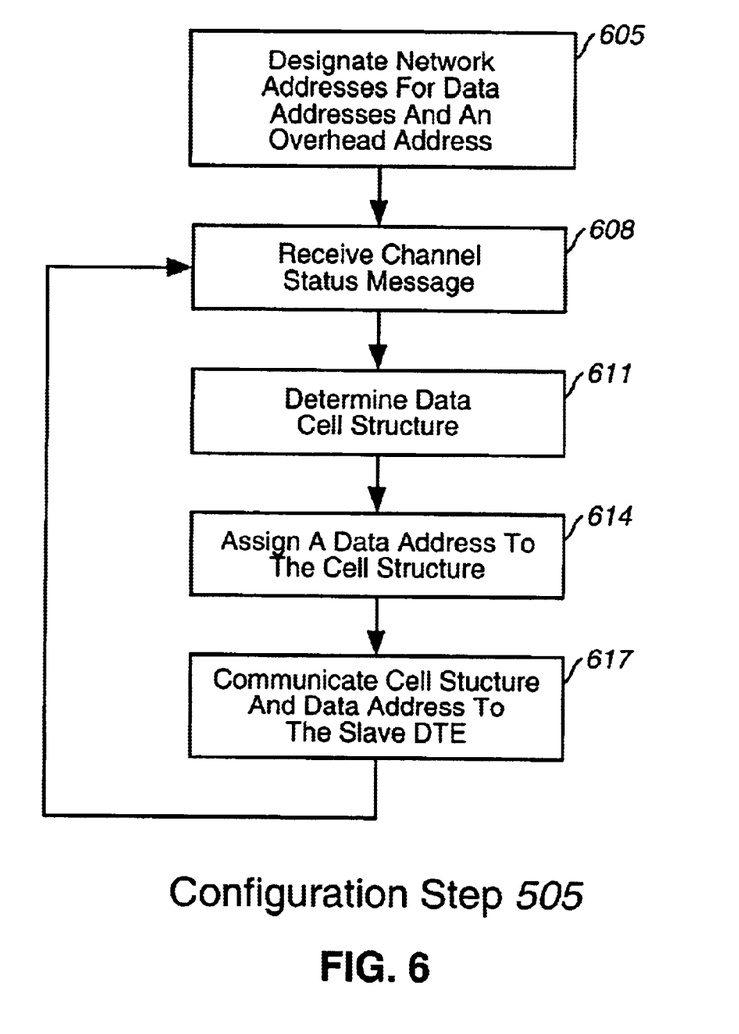
FIG. 6 is a flowchart that illustrates the steps in configuring the T1/ATM interface.

FIG. 5 is an operational flowchart that illustrates routine 500 for interfacing a TDM T1 link with a cell-switched ATM network according to one embodiment of the present invention. FIG. 6 is an operational flowchart that illustrates routine 600 for configuring the T1/ATM interface.

Figure 7:
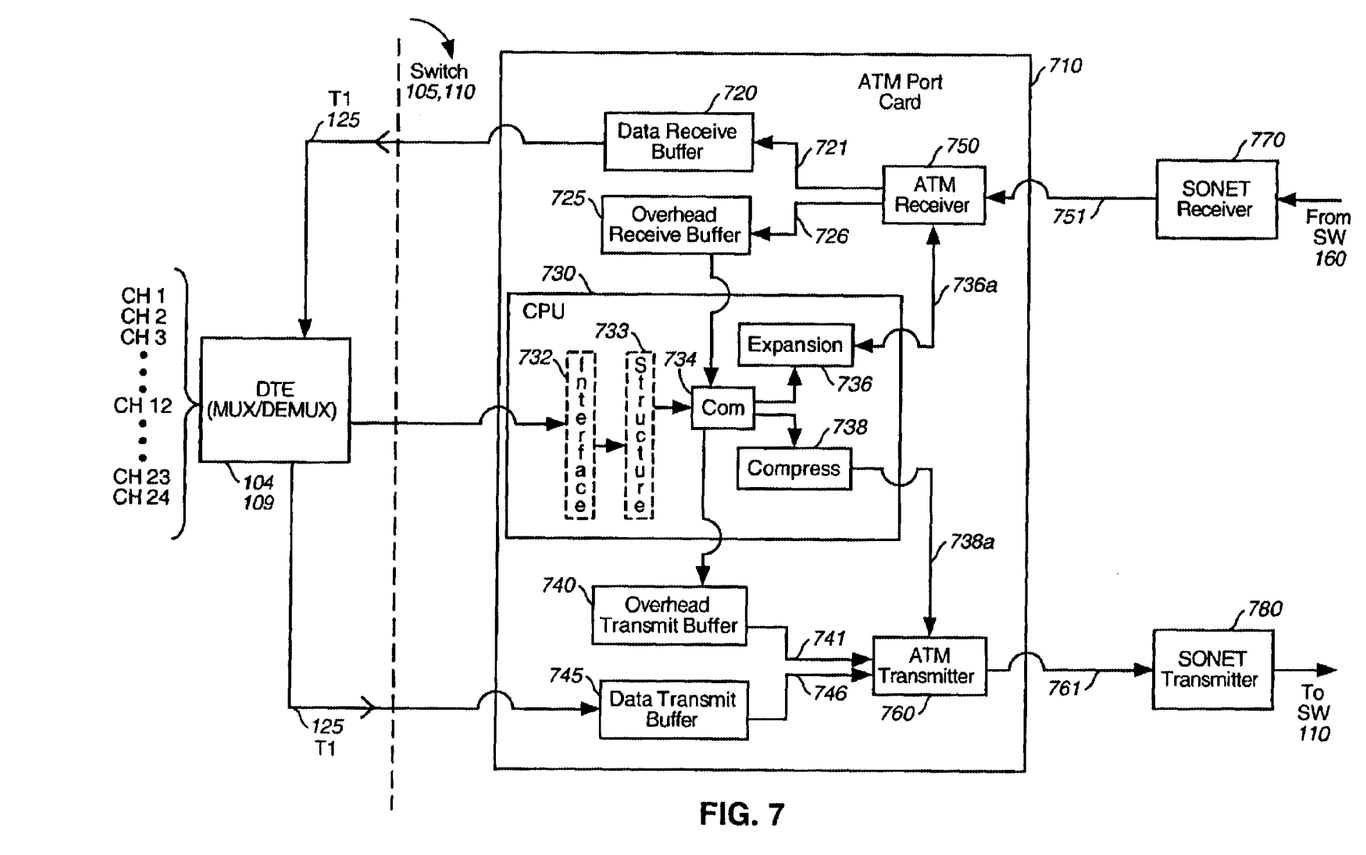
FIG. 7 is a block diagram of the node components that interface the T1 link to the ATM network.

FIG. 7 illustrates a block diagram of the T1/ATM interface at ATM switches 105 and 110 in FIG. 1, where switches 105, 110 would be located in different nodes in ATM network 101. FIG. 7 includes: DTE 104 or 109, port card 710, SONET receiver 770, and SONET transmitter 780. Port card 710 is located at both ATM switches 105 and 110 and performs the steps in routines 500 and 600. Port card 710 includes: ATM receiver 750, data receive buffer 720, overhead receive buffer 725, CPU 730, overhead transmit buffer 740, data transmit buffer 745, and ATM transmitter 760.

In step 505, the T1/ATM interface is configured based on a channel status message from DTE 104 or DTE 109. The channel status message identifies which of the 24 channels serviced by T1 link 125 are active, and which channels are idle. For example, a channel status message reflecting the current state of FIG. 1 would depict channels 3, 12, and 23 as being active and the remaining 21 channels as being idle. Step 505 is described in more detail in FIG. 6.

In step 508, data transmit buffer 745 receives T1 frames from T1 link 125. Each T1 frame contains a timeslot for each of the 24 channels supported by the T1 link. Timeslots that correspond to active channels are known as "active timeslots" and timeslots that correspond to idle channels are known as "idle timeslots".

In step 511, ATM transmitter 760 removes one or more idle timeslots from T1 frames to create compressed T1 frames. The idle timeslots are ignored or discarded in each T1 frame leaving only the T1 frame bit and the active timeslots in each compressed T1 frame. For example, if channels 3, 12, and 23 are the only active channels, then timeslots 1–2, 4–11, 13–22, and 24 are removed from each T1 frame. Each resulting compressed T1 frame is comprised of the T1 frame bit and active timeslots 3, 12, and 23.

In step 514, ATM transmitter 760 inserts one or more compressed T1 frames into the payload of an ATM cell until the ATM cell payload is filled to capacity. ATM cells that carry compressed T1 frames are known as "data cells" to distinguish them from "overhead cells", which are used to carry overhead messages. Overhead messages are used in step 505 to configure the T1/ATM interface.

The number of compressed T1 frames inserted in each data cell is determined during configuration step 505 and depends on the size of the compressed T1 frames and the size of the data cell payload. As stated earlier, an ATM cell payload (and data cell payload) has a 48-byte capacity. The compressed T1 frames vary in size depending on the number of 1-byte active timeslots in each compressed T1 frame.

In one embodiment, an integer number of compressed T1 frames are packaged in each data cell. This is advantageous at the destination ATM switch (either ATM switch 105 or 110 depending on which ATM switch is receiving the data cell) because a T1 framer is not needed to differentiate between consecutive reconstructed T1 frames, but typically requires the addition of a spare bit field in the data cell payload. The spare bit field fills out the 48-byte data cell payload when it is not evenly divisible by the size of the compressed T1 frame. The spare bit field is simply a section of the data cell payload that is filled with all logic "0"s, and is ignored by the destination ATM switch.

In step 517, ATM transmitter 760 sends the data cell over the ATM network to the destination ATM switch. As illustrated by FIG. 1, the data cell may travel to multiple nodes before arriving at the destination ATM switch depending on existing network traffic. After a cell arrives at a node, the node ATM switch reads the address in the cell header and determines the most efficient route to the destination ATM switch based on current network traffic.

In one embodiment, ATM network 101 is implemented as a high speed fiber optic network. In this embodiment, ATM transmitter 760 sends the data cell to SONET transmitter 780. SONET is an ATM bearing physical standard designed for high speed fiber optic networks. SONET is described as an example ATM bearing physical signal standard and is not intended to limit the present invention. SONET transmitter 780 loads the data cell into a SONET frame and sends the SONET signal over the ATM network to the destination ATM switch (ATM switch 105 or ATM switch 110). At the destination ATM switch, SONET receiver 770 unloads the data cell from the SONET frame and sends the data cell to ATM receiver 750.

In step 520, ATM receiver 750 unloads the compressed T1 frames from the data cell. If a spare bit field was used in the data cell payload, then the location and size of the spare bit field must be specified during configuration step 505. This is needed for ATM receiver 750 to unload the compressed T1 frames.

In step 523, ATM receiver 750 inserts one or more idle timeslots back into each compressed T1 frame to expand the compressed T1 frames to complete T1 frames. The placement of the idle timeslots corresponds to the channel that each idle timeslot supports. For example, if a compressed T1 frame contains a T1 frame bit and 3 active timeslots for active channels 3, 12, and 23, then idle timeslots need to be created at positions 1–2, 4–11, 13–22, and 24 to restore the compressed T1 frame to a complete T1 frame.

In step 526, the restored T1 frames are sent to DTE 104 or 109, depending on the destination ATM switch for the data cell. The DTE de-multiplexes the T1 frames and delivers the channel samples in each T1 frame to their particular user destinations. A standard T1 port expects 24 timeslots between consecutive T1 frame bits, and distributes the channel samples in each timeslot based on the timeslot position. This is the motivation for restoring the compressed T1 frames to complete T1 frames in step 523.

FIG. 6 is an operational flowchart illustrating configuration step 505. In one embodiment, one destination ATM switch is a designated the Master ATM switch at a master node, and the another destination ATM switch is designated the Slave ATM switch at a slave node. The Master ATM switch is so named because it makes all the interface configuration decisions. This is done to avoid simultaneous configuration changes that could occur if both Master and Slave had equivalent decision making authority. For example, ATM switch 105 may be designated the Master ATM switch, and ATM switch 110 may be the Slave ATM switch.

In step 605, ATM network administrator 102 designates multiple network addresses to be used as data addresses, and one network address to be used as an overhead address. Multiple data cell addresses are designated to allow for multiple cell configurations to exist. The data and overhead addresses also serve as network addresses that identify the destination ATM switch of a particular data cell or a particular overhead cell.

In step 608, CPU 730 at Master ATM switch 105 receives a channel status message from DTE 104. The channel status message identifies which channels are active and which channels are idle. Either the Master ATM switch or the Slave ATM switch can receive the channel status message. If Slave ATM switch 110 receives the channel status message from DTE 109, then Slave ATM switch 110 packages the channel status message in an overhead cell and sends it over the ATM network to the Master ATM switch 105. The overhead message may include a request for the Master ATM switch to increase or decrease the available channels carried over the ATM network.

In step 611, CPU 730 at Master ATM switch 105 determines the cell structure that maximizes the number of compressed T1 frames that can be carried in the data cell. This is done by calculating the integer number of compressed T1 frames that will fit in the 48-byte data cell payload, and determining the length of any spare bit field that is necessary. The spare bit field is necessary to fill out the data cell payload when an integer number of compressed T1 frames does not completely fill the data cell payload.

In step 614, CPU 730 at Master ATM switch 105 assigns a data address to the cell structure determined in step 611. The data addresses identifies an ATM cell as a data cell, and also identifies the cell structure of the data cell. If additional channel status messages are received that reflect changes in channel status, multiple distinct cell structures can be active. Multiple data addresses are needed to distinguish the distinct cell structures. Additionally, a data address also identifies the destination ATM switch of the data cell because they are chosen from the available network addresses.

In step 617, CPU 730 at Master ATM switch 105 communicates the cell structure and corresponding data address to processor 730 at Slave ATM switch 110 by sending an overhead message in one or more overhead cells. After processing the overhead message, Slave ATM switch 110 is apprized of the distinct cell structure of data cells that bear a particular data address in their cell header.

Designating a Master ATM switch to make all the cell configuration decisions is but one embodiment. In another embodiment, ATM switches 105 and 110 are given equal decision making authority, where the ATM switches negotiate the cell structure per a specified communications protocol.

Furthermore, port card 710 has been discussed as being implemented in ATM switches 105 and 110. Those skilled in the art will recognize that port card 710 could just as well be implemented in DTEs 104, 109. In which case, the DTEs would compress [decompress] T1 frames and load [unload] T1 frames from ATM cells according to the present invention.

VII. ATM Port Card Detailed Description

Port card 710 comprises the T1/ATM interface components at destination ATM switches 105 and 110. Port card 710 includes: data receive buffer 720, overhead receive buffer 725, ATM receiver 750, CPU 730, overhead transmit buffer 740, data transmit buffer 745, and ATM transmitter 760. CPU 730 comprises interface module 732, structure module 733, corn module 734, expansion module 736, compression module 738, and T1 interface 735.

A. Transmitting and Receiving Compressed T1 Frames

Port card 710 has full duplex capability, meaning that port card 710 can transmit and receive ATM cells simultaneously.

ATM cells that carry compressed T1 frames are assigned a data address in their cell header and are labeled as data cells. ATM cells carrying overhead messages are assigned an overhead address in their cell header and are labeled as overhead cells. An ATM network administrator designates multiple network addresses to be used as data addresses and one address to use as an overhead address.

During transmission, DTE 104 (or 109) multiplexes channel samples into T1 frames on T1 link 125 and sends the outgoing T1 frames to data transmit buffer 745. Data transmit buffer 745 sends the T1 frames to ATM transmitter 760. ATM transmitter 760 removes the idle timeslots from each T1 frame to create compressed T1 frames under the control of compression module 738. ATM transmitter 760 then forms a data cell by loading one or more compressed T1 frames in an ATM cell payload and assigning a data address in the cell header.

ATM transmitter 760 sends the data cell to SONET transmitter 780. SONET is an ATM bearing physical standard designed for use in high speed fiber optic networks. SONET is a described as an example ATM bearing physical standard and is not intended to limit the present invention. Other physical standards can be used. SONET transmitter 780 loads multiple data cells into SONET frames and sends a SONET signal over the ATM network to the destination ATM switch.

During reception, SONET receiver 770 unloads ATM cells from SONET frames and sends the ATM cells to ATM receiver 750. ATM receiver 750 reads the address in the header of each ATM cell.

If the header address is an overhead address, ATM receiver 750 unloads the overhead message and sends the message to the overhead receive buffer 725. Buffer 725 notifies Com module 734, which will read and process the overhead message when convenient.

If the header address is a data address, then an ATM cell is a data cell carrying compressed T1 frames. ATM receiver 750 unloads the compressed T1 frames from the data cell payload. ATM receiver 750 then restores the compressed T1 frames to complete T1 frames by inserting idle timeslots under control of expansion module 736. The restored T1 frames are sent to data receive buffer 720. Buffer 720 sends the restored T1 frames to DTE 104 (or 109) which de-multiplexes the T1 frames and distributes the channel samples to their respective channel users.

B. Configuring the T1/ATM Interface

To configure port card 710, DTE 104 or 109 sends a channel status message to CPU 730 that identifies which of the 24 channels supported by T1 link 125 are active, and which channels are idle.

CPU 730, also referred to as processor 730, comprises interface module 732, structure module 733, corn module 734, expansion module 736, and compression module 738. Interface module 732 conducts all communications with the DTEs and receives the channel status message. CPU 730 controls expansion module 734 and compression module 736 based on the channel status message. If port card 710 is a Master port card at a Master node, then interface module 732 sends the channel status message to structure module 733. If port card 710 is a Slave port card, then interface module 732 sends the channel status message to corn module 734, which forwards the channel status message to the Master port card in an overhead message.

Structure module 733 determines a cell structure that maximizes the number of compressed T1 frames that are carried in each data cell based on the channel status message. For example assume that channels 3, 12, and 23 are identified as being active by the channel status message. Each resulting compressed T1 frame will contain 3 one-byte active timeslots, and the T1 frame bit for a total of 25 bits in each compressed T1 frame. Fifteen of these 25-bit compressed T1 frames will occupy 375 bits of the 384 bit (48-byte) data cell payload capacity. This leaves 11 extra bits, which are set to logic "0" and labeled the spare bit field. The spare bit field can appear at the front-end or at the back-end of the data cell payload, as long as both the Master and Slave port cards are aware of its location and size. Structure module 733 sends the cell structure to corn module 734.

Com module 734 assigns a unique data address to the cell structure designed by structure module 733. This is done so that each port card can distinguish multiple cell structures that result from multiple channel status messages when a data cell is received.

Com module 734 then creates an overhead message to communicate the cell structure and data address to the Slave port card. In the example above, assume corn module 734 assigns data address 790 to the cell structure. The overhead message alerts the Slave port card that each data cell addressed to 790 will contain 15 compressed T1 frames and a leading or trailing 11-bit spare bit field. Further, the overhead message will state that each compressed frame supports channels 3, 12, and 23 on the T1 link. Com module 734 sends the overhead message to the overhead transmit buffer 740.

ATM transmitter 760 reads the overhead buffer 740 when convenient. ATM transmitter 760 packages the overhead message in ATM cells and knows to assign the overhead address to any message read from buffer 740. ATM transmitter 760 then sends the resulting overhead cells to SONET transmitter 780. SONET transmitter 780 loads the overhead cells in SONET frames and sends a SONET signal over the ATM network to the Slave port card.

Com module 734 also communicates the cell structure and corresponding data address to expansion module 736 and compression module 738. Expansion module 736 controls the expansion of incoming compressed T1 frames in ATM receiver 750 via line 736a. Compression module 738 controls the compression of T1 frames in ATM transmitter 760 via line 738a.

Structure module 733 is only utilized in the Master ATM switch, which is why it is represented with dashed lines in FIG. 7. This is but one embodiment. In another embodiment, both port cards utilize structure module 733 and have equivalent authority to configure the ATM/T1 interface per a specified protocol.

C. Compressing and Expanding T1 Frames

Figure 8:
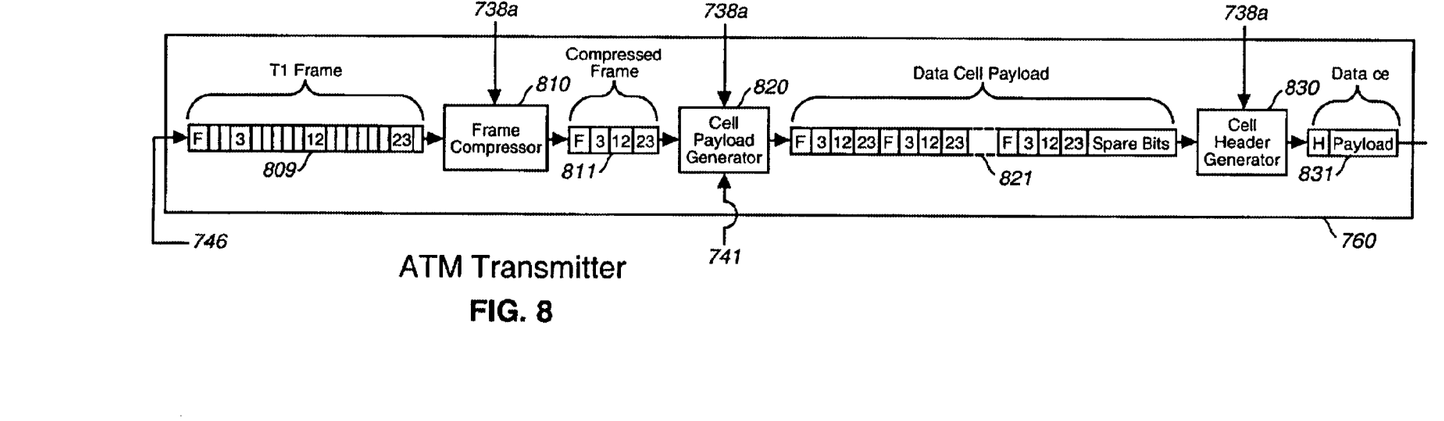
FIG. 8 is a block diagram of the components in an ATM transmitter.

FIG. 8 is a block diagram of the components in ATM transmitter 760 that form data cells and overhead cells. ATM transmitter 760 includes frame compressor 810, payload generator 820, and header generator 830.

During frame transmission, compression module 738 controls frame compressor 810, payload generator 820, and header generator 830 by control signal 738a. Frame compressor 810 receives complete T1 frames from data transmit buffer 745. Compression module 738 directs frame compressor 810 to remove the idle timeslots from each T1 frame based on the idle channels identified in the channel status message.

For example, FIG. 8 illustrates T1 frame 809 being reduced to compressed T1 frame 811 that contains only active timeslots 3, 12, 23 and the frame bit. Compressed T1 frame 811 is 25 bits in size since each timeslot carries an 8-bit sample of the channel it supports. Frame compressor 810 sends each compressed T1 frame to payload generator 820.

Overhead messages from overhead transmit buffer 740 bypass frame compressor 810. Overhead messages are sent directly to payload generator 820 on line 741.

Compression module 738 directs payload generator 820 to construct a data cell payload 821 according to the cell structure designed by structure module 733 during interface configuration. For example, fifteen 25-bit compressed frames 811 will fit in a 384-bit (48-byte) data cell payload. In one embodiment, compression module 738 directs payload generator 820 to group 15 compressed T1 frames and adds an 11-bit spare bit field to fill out the data cell payload.

Payload generator 820 sends the resulting data cell payload 821 to header generator 830.

In another embodiment, compression module 738 directs payload generator 820 to place the active timeslots from the 15 compressed T1 frames in the payload first, followed by the framing bits for each frame to form a frame b bit field, followed by the 11-bit spare bit field to fill out the data cell payload. This particular embodiment lends itself to an efficient and easy to implement elastic store buffer at the receiving end where each ATM cell is reconverted back into T1. In this embodiment, the active timeslots are shifted into the T1 transmitter during their time period of the T1 frame, and the elastic store buffer doesn't shift during the time periods of inactive timeslots. Just as the elastic store buffer is exhausted of all 15 frames of data, a new set of 15 frames is loaded into the elastic store buffer from the ATM cell buffer 720. To facilitate frame slips in which the incoming ATM cells do not arrive frequently enough to reload the elastic store buffer before it has exhausted all 15 frames, the last frame is wrapped around and fed back into it, allowing itself to be duplicated. If there are no cells to reload the elastic store buffer, the duplicated last frame is then fed into the T1 stream as often as is needed until a new cell arrives. This duplication gives incoming cells time to enter into the ATM cell buffer 720 and be delivered to the elastic store buffer. If incoming cells arrive too quickly, a new cell is delivered to the elastic store buffer before the 15th frame within it is delivered to the T1 transmitter, thus deleting a frame worth of data and allowing the T1 signal to catch up to the incoming data from the ATM cells.

Header generator 830 adds the ATM header described in FIG. 2 to the data cell payload to form a data cell. Compression module 738 supplies the data address assigned to the cell structure during the configuration step 505. The data address identifies the cell structure of the data cell and the address of the destination ATM switch. Header generator 830 inserts the data address in the VPI/VCI field of the cell header. Header generator 830 sends the completed data cell 831 to SONET transmitter 780.

Figure 9:
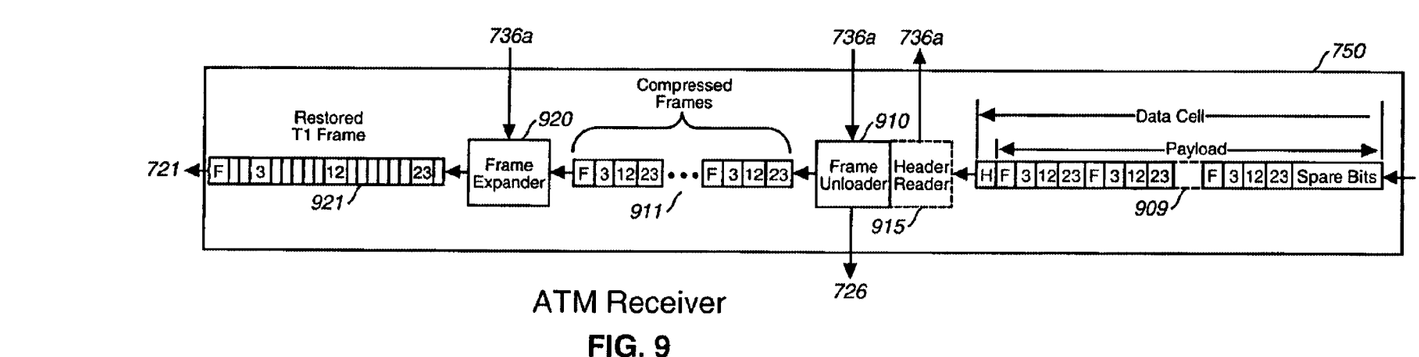
FIG. 9 is a block diagram of the components in an ATM receiver.

FIG. 9 is a block diagram of ATM receiver 750 which receives ATM cells and expands compressed T1 frames carried in those ATM cells that are data cells. ATM receiver 750 includes frame unloader 910, header reader 915, and frame expander 920.

ATM receiver 750 receives ATM cells on line 751 from SONET receiver 770. Header reader 915 reads the address in the VPI/VCI field of the ATM cell header. If the address is an overhead address, frame unloader 910 sends the overhead message in the cell payload to overhead receive buffer 725 on line 726. If the address is a data address, Header reader 915 sends the data address to expansion module 736 so that the cell structure can be determined.

Expansion module 736 retrieves the cell structure which was assigned to the data address during interface configuration. In FIG. 9, the cell structure is 15 compressed T1 frames and an 11-bit trailing spare bit field. Each compressed T1 frame contains a frame bit and 3 active timeslots that support channels 3, 12, and 23. Expansion module 736 informs frame unloader 910 of the cell structure. Based on the cell structure information, frame unloader 910 strips off the spare bit field from data cell 909 and sends the compressed T1 frames 911 to frame expander 920.

Frame expander 920 expands each compressed T1 frame 911 to a complete T1 frame under control of expansion module 736. Expansion module 736 knows which idle timelsots were removed based on the cell structure assigned to the data address. Expansion module 736 instructs frame expander 920 to insert the idle timeslots in their requisite positions to fill out and restore the T1 frame. In FIG. 9, timeslots need to be added to support channels 1–2, 4–11, 13–22, and 24. Once this done, frame expander 920 sends the restored T1 frames 921 to the data receive buffer 720 on line 721. Data receive buffer 720 forwards the restored T1 frames to DTE 104 at the required rate.

VIII Cell-structure

The 48-byte data cell payload may be organized in multiple cell structures to carry the compressed T1 frames. In one embodiment shown by data cell 909 in FIG. 9, the T1 frame bit remains attached to its respective set of active timeslots. A spare bit field is added when an integer number of compressed T1 frames does not fill out the data cell payload.

In another embodiment, the T1 frame bits are detached from their respective active timeslots and grouped together in a frame bit field of the data cell payload. This embodiment offers the option of adding a checksum field to the data cell payload. The checksum field is generated from the frame bit field and is analyzed by the ATM receiver to detect bit errors caused by the physical line during transmission. In one example, the check sum field is generated by implementing a Cyclic Redundancy Check (CRC) on the frame bit field.

In another embodiment, the T1 frame bits are detached from their respective set of active timeslots and inserted in the 5-byte header of the data cell. In one example, the T1 frame bits replace the least significant bits in the VCI field of the data cell header. This embodiment maximizes the number of active timeslots that can be packaged in the data cell payload, but reduces the number of VCI destination addresses. This embodiment is most successful when the compressed T1 frames are relatively large, which results in a small number of T1 frame bits being carried by the 5-byte data cell header. The various ATM cell structures that can implemented to carry T1 frames are more fully explained in co-pending Application, entitled, "Method and System for Emulating a T1 Link Over a Cell-Switched Network., Attorney Docket No.RIC-97-001, which is incorporated herein by reference.

IX. E1 Emulation

The present invention has been described in the environment of T1 link interfacing with an ATM network. Those skilled in the art will recognize that the invention is also useful in the environment of an E1 link interfacing with an ATM network. E1 is a European time domain multiplexed (TDM) communications standard that is very similar to T1. The difference is that an E1 link may carry 32 distinct voice grade channels for a transmission rate of 2.048 Mbps, whereas a T1 link may carry 24 distinct voice grade channels for a transmission rate of 1.544 Mbps. An E1 link transmits 8000 frames/sec just as a T1 link does.

An E1 frame carries 32 DS0 timeslots in an E1 payload, whereas a T1 frame carries 24 DS0 timeslots in a T1 payload. In an E1 frame, the HDLC or signaling timeslot is the $31^{st}$ timeslot in the E1 payload, and a framing pattern is carried in the 32nd.

Furthermore, the present invention is not limited to interfacing T1 or E1 link with an ATM network. As would be apparent to a person skilled in the art, the present invention can be used in any synchronous or asynchronous digital transmission link interfacing with any packet or cell-based network. This includes a T1 or E1 link, that is carrying any type of data on any number of channels, that is interfaced with any current or future ATM-based network.

X. Computer Implementation of Invention

The subject invention has been described above with the aid of functional building blocks illustrating the performance of specified functions and relationships thereof. The boundaries of these functional building blocks have been defined partly for the convenience of the description. Alternate boundaries may be defined so long as the specified functions and relationships thereof are appropriately performed. Any such alternate boundaries are thus within the scope and spirit of the claimed invention. These functional building blocks may be implemented by discrete components, application specific integrated circuits, processors executing appropriate software, and the like or any combination thereof. It is well within the scope of a person with ordinary skill in the art to develop the appropriate circuitry and/or software to implement these functional building blocks.

Figure 10:
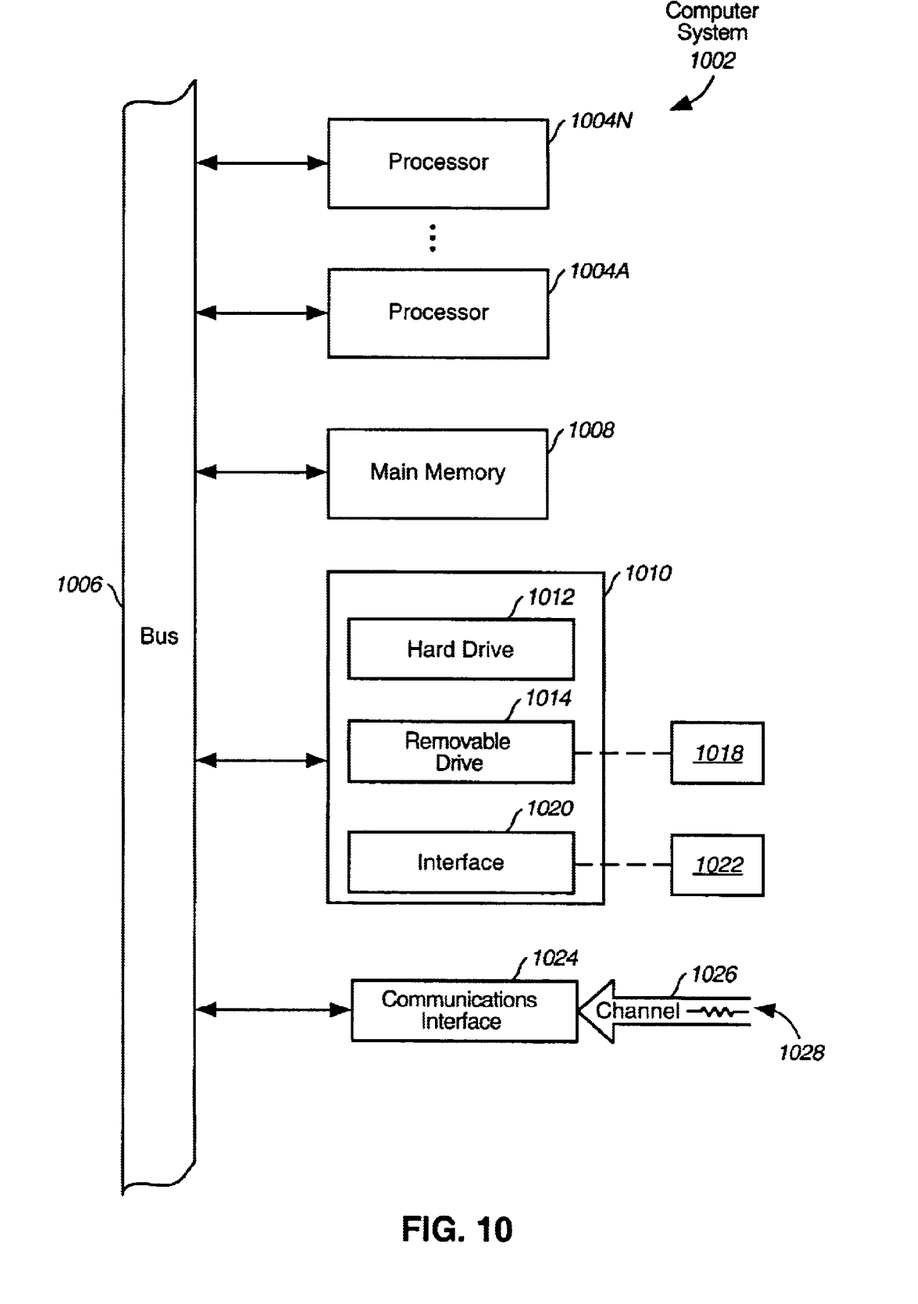
FIG. 10 is a diagram of a computer system that may be used to implement one embodiment of the present invention.

In one embodiment, the invention is directed toward a software and/or hardware embodiment in a computer system. An example computer system 1002 is shown in FIG. 10. The computer system 1002 includes one or more processors, such as processors 1004A–N. The processors 1004A–N are connected to a communication bus 1006. Various software embodiments are described in terms of this example computer system. After reading this description, it will become apparent to a person skilled in the relevant art how to implement the invention using other computer systems and/or computer architectures.

Computer system 1002 also includes a main memory 1008, preferably random access memory (RAM), and can also include a secondary memory or secondary storage 1010. The secondary memory 1010 can include, for example, a hard disk drive 1012 and a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and data.

In alternative embodiments, secondary memory 1010 may include other similar means for allowing computer software and data to be loaded into computer system 1002. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1002.

Computer system 1002 can also include a communications interface 1024. Communications interface 1024 allows software and data to be transferred between computer system 1002 and external devices. Examples of communications interface 1024 can include a modem, a network interface (such as an Ethernet card), a communications port, a PCMCIA slot and card, etc. Software and data transferred via communications interface 1024 are in the form of signals 1026 which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 1026. These computer program products are means for providing software (e.g., computer programs) to computer system 1002.

Computer programs (also called computer program logic) are generally stored in main memory 1008 and/or secondary memory 1010 and executed therefrom. Computer programs can also be received via communications interface 1024. Such computer programs, when executed, enable the computer system 1002 to perform the features of the present invention as discussed herein. In particular, the computer programs, when executed, enable the processor 1004 to perform the features of the present invention. Accordingly, such computer programs represent controllers of the computer system 1002.

In an embodiment where the invention is implemented using software, the software may be stored in a computer program product and loaded into computer system 1002 using removable storage drive 1014, hard drive 1012 or communications interface 1024. The computer control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

XI. Conclusion

While various embodiments of the present invention have been described above, it should be understood that they have been presented in a way of example only, and not limitation. It will be understood by those skilled in the art that the various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A method of interfacing a time domain multiplexed (TDM) link with a cell-switched network at a first node and a second node, where the TDM link supplies TDM frames comprising at least one active timeslot and at least one idle timeslot, and where each active timeslot carries a sample of a corresponding active channel and each idle timeslot carries a sample of a corresponding idle channel, the method comprising at the first node the steps of:

receiving a channel status message at the first node that identifies each active channel and each idle channel in the TDM link;

determining a cell structure based on the channel status message that maximizes the number of compressed TDM frames that may be carried by a data cell;

assigning a data address to the cell structure, whereby each cell structure is identified by a distinct data address and multiple cell structures may result from multiple channel status messages reflecting changing channel status on the TDM link;

removing one or more idle timeslots from TDM frames to create compressed TDM frames; wherein each of the compressed TDM frames comprises one or more active timeslots;

inserting one or more compressed TDM frames into the data cell; and sending the data cell over the cell-switched network from the first node to the second node.

2. The method of claim 1, further comprising at the second node the steps of:

unloading the one or more compressed TDM frames from the data cell sent in said sending step;

adding one or more idle timeslots to each compressed TDM frame unloaded from the data cell to restore the one or more compressed TDM frames to one or more TDM frames; and sending the one or more restored TDM frames to a DTE.

3. The method of claim 1, further comprising the steps of:

communicating the cell structure and the data address to the second node in an overhead message carried by one or more overhead cells; wherein the one or more overhead cells are identified by an overhead address.

4. The method of claim 1, wherein the first node is a Master node and the second node is a Slave node, the method further comprising:

communicating the cell structure and the data address to the Slave node in an overhead message carried by one or more overhead cells; wherein the one or more overhead cells are identified by an overhead address.

5. The method of claim 4, further comprising the steps of:

receiving a second channel status message at the Slave node; wherein the second channel status message notifies the Slave node of a change in channel status of the TDM link; and communicating the second channel status message to the Master node in an overhead message using one, or more overhead cells;

whereby, the Master node determines a second cell structure instead of the Slave node in order to avoid a simultaneous change in cell structure of data cells traveling over the cell-switched network.

6. A cell transmitter at a first node, comprising:

means for removing one or more idle timeslots from TDM frames to form compressed TDM frames; wherein each of said compressed TDM frames comprises one or more active timeslots;

means for inserting one or more compressed TDM frames into a data cell, the means for inserting one or more compressed TDM frames comprising means for inserting an integer number of compressed TDM frames into the data cell;

means for transmitting the data cell to a second node; and a processor for controlling said means for removing and said means for inserting based on a channel status message.

7. The cell transmitter of claim 6, wherein the processor comprises:

means for receiving said channel status message that identifies one or more active channels and one or more idle channels;

means for determining a cell structure based on said channel status message that maximizes a number of said compressed TDM frames that may be carried in said data cell; and means for assigning a data address to said cell structure.

8. The cell transmitter of claim 7, wherein the processor further comprises means for creating an overhead message comprising said cell structure and said data address; and wherein said cell transmitter further comprises means for loading said overhead message in one or more overhead cells, and means for sending said overhead cells to said second node.

9. A cell transmitter at a first node, comprising:

means for removing one or more idle timeslots from TDM frames to form compressed TDM frames, wherein each of said compressed TDM frames comprises one or more active timeslots;

means for inserting one or more compressed TDM frames into a data cell;

means for inserting a spare bit field in said data cell when an integer number of compressed TDM frames does not completely occupy a capacity of said data cell;

means for transmitting the data cell to a second node; and means for controlling said means for removing and said means for inserting based on a channel status message.

10. A cell receiver at a second node, comprising:

means for receiving a data cell;

means for unloading one or more compressed TDM frames from said data cell;

means for adding one or more idle timeslots to each compressed TDM frame to restore said one or more compressed TDM frames to one or more TDM frames; and a processor for controlling said means for unloading and said means for receiving based on a channel status message.

11. The cell receiver of claim 10, wherein said processor is located at a Slave node, said processor further comprising:

means for receiving said channel status message that identifies one or more active channels and one or more idle channels; and means for creating an overhead message comprising said channel status message and a request for a processor at a Master node-to determine a cell structure based on said channel status message.

12. A computer program product comprising a computer usable medium having computer program logic stored therein for interfacing a TDM link with a cell-switched network at a first node, wherein the computer program logic comprises:

receiving means for enabling a computer to receive a channel status message that identifies one or more active channels and one or more idle channels;

determining means for enabling said computer to determine a cell structure based on said channel status message that maximizes a number of compressed TDM frames that may be carried by a data cell;

assigning means for enabling said computer to assign a data address to said cell structure;

removing means for enabling said computer at the first node to remove one or more idle timeslots from TDM frames to create compressed TDM frames; wherein each of said compressed TDM frames comprises one or more active timeslots;

inserting means for enabling said computer to insert one or more compressed TDM frames into the data cell; and sending means for enabling said computer to send said data cell over the cell-switched network to a second node.

13. The computer program product of claims 12, whereby multiple cell structures may result from multiple channel status messages reflecting changing channel status on the TDM link and each cell structure is identified by a distinct data address.

14. The computer program product of claim 13, wherein said computer program logic further comprises:

communicating means for enabling said computer to communicate said data cell structure and said data address to said second node in an overhead message carried by one or more overhead cells; wherein said one or more overhead cells are identified by an overhead address.

15. A computer program product comprising a computer usable medium having computer program logic stored therein for interfacing a TDM link with a cell-switched network at a second node, wherein the computer program logic comprises:

receiving means for enabling a computer to receive a data cell from a first node;

unloading means for enabling said computer to unload one or more compressed TDM frames from said received data cell;

adding means for enabling said computer to add one or more idle timeslots to each compressed TDM frame unloaded from said received data cell to restore said one or more compressed TDM frames to one or more TDM frames;

controlling means for controlling said unloading means and said adding means based on a channel status message; and sending means for enabling said computer to send said one or more restored TDM frames to a DTE.

16. A system for interfacing a T1 link with an Asynchronous Transfer Mode (ATM) network at a first node and a second node, where the T1 link supplies T1 frames comprising at least one active timeslot and at least one idle timeslot, and where each active timeslot carries a sample of a corresponding active channel and each idle timeslot carries a sample of a corresponding idle channel, the system comprising:

receiving a channel status message at the first node that identifies each active channel and each idle channel of the T1 link;

determining a cell structure based on the channel status message that maximizes a number of compressed T1 frames that may be carried by a data cell;

means for removing one or more idle timeslots from T1 frames to create compressed T1 frames, based on the channel status message, wherein each compressed T1 frame comprises one or more active timeslots;

means for inserting one or more compressed T1 frames into the data cell; and means for sending said data cell over the ATM network from the first node to the second node.

17. The system of claim 16, further comprising:

means for unloading said one or more compressed T1 frames from said data cell;

means for adding one or more idle timeslots to each compressed T1 frame unloaded from said data cell to restore said one or more compressed T1 frames to one or more T1 frames; and means for sending said one or more restored T1 frames to a DTE, whereby less idle channel samples are carried over the ATM network resulting in efficient utilization of a bandwidth of the ATM network.

18. The system of claim 16, further comprising:

assigning a data address to the cell structure, whereby each cell structure is identified by a distinct data address and multiple cell structures may result from multiple channel status messages reflecting changing channel status on the T1 link.

19. A port card for interfacing a TDM link with a cell-switched network at a first node, comprising:

a data transmit buffer for receiving TDM frames from the TDM link;

a cell transmitter for converting said TDM frames in said data transmit buffer to compressed TDM frames, and sending said compressed TDM frames over the cell-switched network to a second node in a data cell, wherein the cell transmitter comprises:
   a frame compressor for removing one or more idle timeslots from said TDM frames to create said compressed TDM frames, wherein each of said compressed TDM frames comprises one or more active timeslots,
   a cell payload generator for loading one or more compressed TDM frames in a payload of said data cell according to a predefined cell structure, wherein the cell structure is based on a channel status message that identifies at least one of one or more active channels and one or more idle channels, and
   a cell header generator for adding a cell header to said data cell payload;

wherein said cell header carries a data address that identifies said cell structure of said data cell payload; and a compression module for controlling said frame compressor based on said channel status message, and for controlling said cell header generator based on said cell structure.

20. The port card of claim 19, further comprising:

a structure module for designing said cell structure based on the channel status message.

21. A port card for interfacing a TDM link with a cell-switched network at a first node, comprising:

a data transmit buffer for receiving TDM frames from the TDM link;

a cell transmitter for converting said TDM frames in said data transmit buffer to compressed TDM frames, and sending said compressed TDM frames over the cell-switched network to a second node in a data cell, wherein the cell transmitter comprises:
   a frame compressor for removing one or more idle timeslots from said TDM frames to create said compressed TDM frames, wherein each of said compressed TDM frames comprises one or more active timeslots,
   a cell payload generator for loading one or more compressed TDM frames in a payload of said data cell based on a channel status message that identifies at least one of one or more active channels and one or more idle channels, and
   a cell header generator for adding a cell header to said data cell payload;

wherein said cell header carries a data address that identifies a cell structure of said data cell payload; and a com module for creating an overhead message to communicate said data address to said second node.

22. A port card for interfacing a TDM link with a cell-switched network at a first node, comprising:

a cell receiver for receiving a data cell that has traveled over the cell-switched network from a second node, and for creating one or more TDM frames from said data cell, wherein the cell receiver comprises:
   a frame unloader for unloading one or more compressed TDM frames from said data cell,
   a frame expander for adding one or more idle timeslots to each compressed TDM frame unloaded from said data cell to restore said one or more compressed TDM frames to one or more TDM frames, and
   a header reader for reading a header of said data cell, wherein said data cell header contains a data address that identifies a cell structure of said data cell and wherein
      the frame unloader unloads the one or more compressed TDM frames from said data cell according to said cell structure;

a data receive buffer for sending said one or more TDM frames to a DTE on the TDM link; and an expansion module for controlling said frame unloader and said frame expander.

23. A method of interfacing a time domain multiplexed (TDM) link with a cell-switched network, the method comprising:

receiving a channel status message at a first node that identifies at least one of each active channel and each idle channel in the TDM link;

removing one or more idle timeslots from TDM frames, based on the channel status message, to create compressed TDM frames;

inserting one or more compressed TDM frames into a data cell; and sending the data cell over the cell-switched network from the first node to the second node.

* * * * *